United States Patent [19]
Fonseca et al.

[11] 3,756,270
[45] Sept. 4, 1973

[54] AUXILIARY ANTI POLLUTION AIR INTAKE DEVICE FOR INTERNAL COMBUSTION ENGINES

[75] Inventors: Marco A. Fonseca; Enrique T. Gibbon; Jose J. Gonzalez, all of Mexico City, Mexico

[73] Assignee: Monocar HC Internacional S.A., Edo de Mexico, Mexico

[22] Filed: Apr. 25, 1972

[21] Appl. No.: 247,375

Related U.S. Application Data

[63] Continuation-in-part of Ser. No. 7,682, Feb. 2, 1970, abandoned.

[52] U.S. Cl. ............ 137/480, 123/119 D, 123/97 B
[51] Int. Cl. ...................... F02d 9/00, F02m 23/00
[58] Field of Search .................. 123/119 D, 124 R, 123/97 B; 137/479, 480, 529, 539

[56] References Cited
UNITED STATES PATENTS

| | | | |
|---|---|---|---|
| 1,177,831 | 4/1916 | Taylor | 137/480 |
| 1,395,932 | 11/1921 | Staude | 137/479 |
| 1,689,280 | 11/1928 | Fansler | 137/480 |
| 1,798,027 | 3/1931 | Myer | 137/480 |
| 2,587,421 | 2/1952 | Willach | 137/539 X |
| 3,118,435 | 1/1964 | Almquist | 137/480 X |
| 3,336,942 | 8/1967 | Keith | 137/529 |
| 3,489,172 | 1/1970 | Whitmore | 137/529 |

FOREIGN PATENTS OR APPLICATIONS

| | | | |
|---|---|---|---|
| 500,420 | 2/1929 | Great Britain | 137/529 |
| 6,856 | 0/1914 | Great Britain | 137/480 |

*Primary Examiner*—Wendell E. Burns
*Attorney*—Imirie & Smiley

[57] ABSTRACT

A fuel economizer device for diminishing pollution exhaust gases discharged by non-supercharged gasoline powered internal combustion engines, includes two basic members having aligned air passageways therethrough and adjustably connected at their adjoining ends, one of said members having an intake opening in its free end portion and with its passageway including adjacent frusto-conical divergent and convergent portions defining a valve chamber of diamond configuration in longitudinal section, and having a seating surface at the juncture of said passageway with said divergent portion, and the other member having an outlet in its free end portion and connectable to the air/fuel intake system of an engine. A valve body is position in said valve chamber and is suspended between first and second springs which extend in opposite directions into the air passageways. The spring biasing the valve body toward seating has a stiffness exceeding that of the other spring, whereby the valve body normally is seated to close the passageway. Increases of vacuum at the intake system of the engine, due, for example, to unloading of the engine, displaces the valve body from its seat to provide an annular air passage around said valve body of increasing cross-section in accordance with valve body displacement. A smoothly increasing amount of auxiliary air flow is thereby provided to the engine intake in proportion to vacuum at the engine intake. Adjustment of the members relative to each other varies spring pressure to regulate valve body displacement in accordance with particular engine requirements so that the device is adaptable to a wide variety of engines.

13 Claims, 10 Drawing Figures

PATENTED SEP 4 1973

PATENTED SEP 4 1973

AUXILIARY ANTI POLLUTION AIR INTAKE DEVICE FOR INTERNAL COMBUSTION ENGINES

CROSS-REFERENCE TO RELATED APPLICATION

This application is a continuation-in-part of application Ser. No. 7,682 filed Feb. 2, 1970, for "Anti-Air Pollution Device" now abandoned.

BACKGROUND OF THE INVENTION

It is common knowledge that it is an extremely difficult task to accomplish a complete and efficient combustion throughout all engine loads and speeds in internal combustion gasoline engines, particularly those for powering automobile vehicles. Efficient combustion is greatly dependent on the air/fuel ratios delivered to the combustion chamber of an engine during its operation. The engine used in an automobile for example is subjected to a great variety of engine modes, such as accelerating, decelerating, cruising, coasting or idling. At all loading and unloading conditions certain proportions of air and fuel must be provided to accomplish proper and complete combustion which cannot be effected by the usual carburetor or air-fuel induction means. There is a tendency of most common induction systems to provide excessive fuel under light load engine conditions, such as idling and constant decelerating, which conditions are constantly occurring under most driving operations. Incomplete combustion results in wasted fuel and unburned hydro carbons which are expelled through the engine's exhaust system into the atmosphere, causing air pollution. Some unburned hydro carbons bypass piston rings and drain into the engine crankcase, diluting oil, causing lubrication problems and premature wear of engine parts. In an effort to overcome the foregoing difficulties, many variations of carburetor adjustment and design have been porposed but the only successful means resides in a fuel injection system. However, such systems, whether mechanical or electronic, are too complicated, expensive and cumbersome for ordinary engines and such installations are feasible only for very limited engine designs.

SUMMARY OF THE INVENTION

In accordance with the present invention, a device including a pair of hollow, conveniently cylindrical members, are threadedly coupled to one another. The two members are so coupled as to permit variation in the overall length of the coupled members. When the two members are coupled as a unit, an inner, preferably cylindrical, passageway extends through both members and has a length in accordance with the degree of interthreading. The passageway terminates at one end at an orifice through which outside filtered air may enter into the device and another orifice disposed at the opposite end of the passageway serves as an air outlet, and which may be connected, for example, to the air/fuel intake system of an engine with which the device is associated.

A valve chamber is defined by contiguous divergent and convergent portions of said cylindrical passageway for housing a valve body, such as a ball or the like, which seats and unseats on a circular seating surface at the juncture of the passage with the upstream edge of the chamber. The valve body is suspended between two helical springs of different rigidity which are housed within said cylindrical passage, the primary spring of greater rigidity urging the body against the circular seat while the secondary spring of lesser rigidity assists in rapidly unseating the valve body, centers the valve body away from the seat, dampens valve body seating, and inhibits chattering.

When the device is in operation, in association with a gasoline powered internal combustion engine of the non-supercharged or normally aspirated type, the device is connected to the engine air/fuel intake system and acts as an auxiliary, secondary air intake control, for air which is admitted through the device and into the intake system during the occurrence of unloading conditions which effect a vacuum increase inside the engine intake system. When such vacuum increase occurs, the resistance of the primary spring is overcome, permitting the valve body to unseat, thus allowing a clearance for auxiliary air admission. The increase in intake vacuum is produced mainly by unloading of the engine, such as decelerating or overrun. Under such conditions the present device provides the necessary air, so that the still incoming gasoline can be mixed with sufficient air for complete combustion. Valve body movement may be varied by regulating spring action through threaded adjustment of the members to adapt the device for different engine requirements.

DETAILED DESCRIPTION OF THE INVENTION

Figure 1:
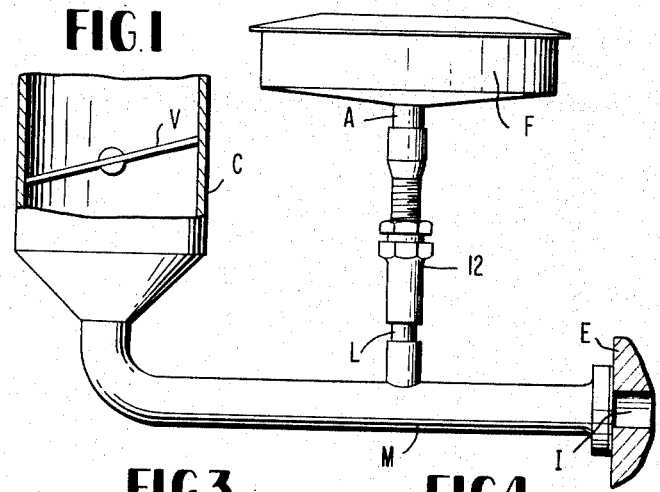
FIG. 1 is a schematic diagram of the anti-pollution and fuel economizer device, according to the invention, operably associated with an air/fuel induction means and a gasoline powered internal combustion engine.

Referring now to the drawings in detail, FIG. 1 diagrammatically illustrates the manner in which an anti-pollution and fuel economizer device 12 in accordance with the present invention may be suitably connected to a non-supercharged gasoline powered internal combustion engine air-fuel system of the normally aspirated type. The device 12 is provided with filtered air from a conventional air cleaner F, or from the carburetor air filter, via a supply conduit A. The output from device 12 passes via a line L to an air/fuel intake system M anywhere between the valve V, controlling the main stream of air-fuel mixture, of a carburetor C or other induction means, and the intake I leading to the combustion chamber of an engine E. The carburetor C is adjusted to provide the normal air/fuel mixture proportions to supply the required amount of fuel for normal power requirements. Obviously, reference to the carburetor C encompasses any desired carburation system, such as multiple or single multi-throat, carburetors, of the normally aspirated type, the line L having plural branches to each intake system M in such event.

Figure 2:
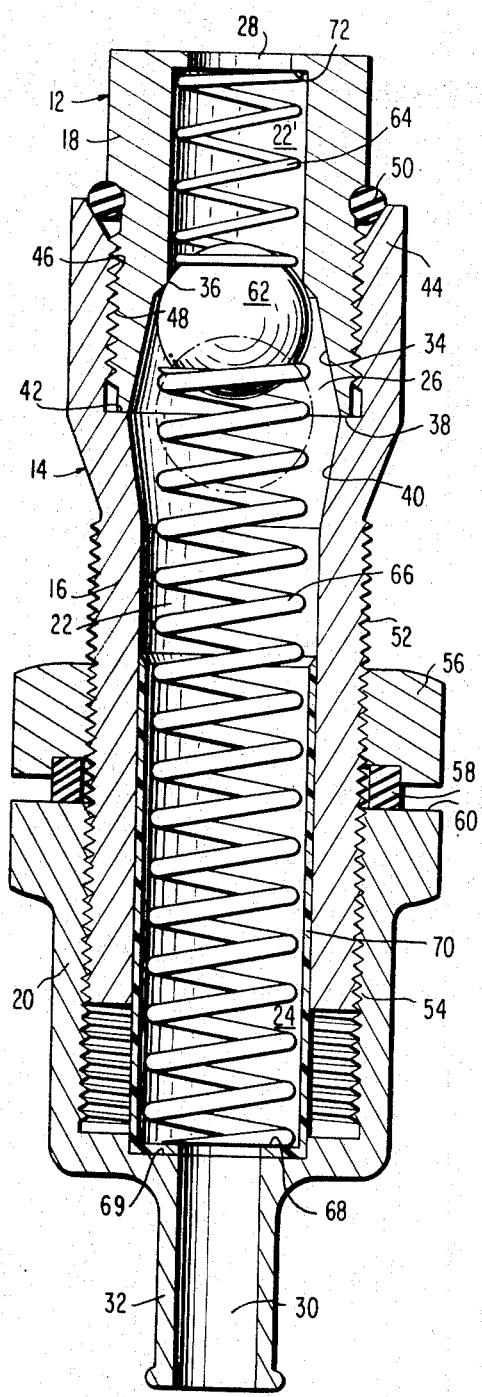
FIG. 2 is a longitudinal cross-sectional view through a device in accordance with the present invention.

The device 12, in accordance with the present invention, as shown in FIG. 2, includes a first cylindrical member 14, comprising a body portion 16 and an end portion 18, and a second cylindrical member 20, said members being adjustably connected. Both members 14 and 20 include aligned axial passageways, 22, 22,' and 24 respectively, extending therethrough, the first mentioned passageway being in two sections 22 and 22' separated by an enlarged valve chamber 26. The section of the first passageway 22' in the end portion 18 terminates in an inlet 28 at which the filtered air in line A of FIG. 1 is admitted, and the second passage 24 in the member 20 terminates in an outlet 30, normally through a nipple 32 on cylindrical member 20. The nipple 32 is connectable to a line such as L in FIG. 1, so that the air admitted through the device passes to the air/fuel intake system M, FIG. 1.

The cylindrical member 14 comprises the two body portions 16, 18 to facilitate formation of the valve chamber 26 which is located at the juncture of the two portions. The chamber 26 comprises a frusto-conical divergent wall 34, the smaller inner end of which is joined concentrically with the passageway section 22' in the portion 18 by a valve seat 36, the larger end of said wall 34 opening through the inner end wall 38 of the portion 18. The chamber also comprises an inverted frusto-conical convergent wall 40, the smaller inner end of which is joined concentrically with the passageway section 22 in the portion 16 with the larger end of said wall 40 opening through the inner end wall 42 of the portion 16. In assembly, the end walls 38 and 42 of the body portions are in abutment so that the divergent-convergent walls 34, 40 provided the valve chamber 26 with a longitudinal section of substantially diamond configuration.

To secure the two portions 16 and 18, comprising member 14, together with their end walls 38 and 42 in abutment, the portion 16 may have a collar portion 44 extending forwardly of the wall 42 to surround the inner end of the end portion 18. The collar 44 has internal threads 46 mating with external threads 48 on the portion 18. When the two portions are fully joined, an O-ring 50 between the two portions provides a positive seal preventing any air leakage at the joint. In addition to facilitating formation of the valve chamber 26, forming cylindrical member 14 in two portions enables ready cleaning of the valve chamber. In order to readily gain access to such chamber and the components therein it is only necessary to unthread the portions 16 and 18 from one another without affecting the adjustment of members 14 and 20.

The first cylindrical member 14 has external threads 52 on the inner end thereof, which threads mate with complimentary threads 54 internally in the second cylindrical member 20. Both sets of threads have considerable extension in a longitudinal direction, and it is evident that when members 14 and 20 are threadably coupled to one another, depending upon how far the first member is threaded into the second member, a considerable variation is possible in the adjustment of the device 12 and in particular the length of the axial passageways 22, 22' and 24 extending therethrough. Preferably, a locking nut 56 is threaded on member 14 and a sealing ring 58 is interposed between the nut and a shoulder 60 on member 20 to secure and seal the members in axially adjusted relation.

A valve body 62, shown as a spherical member such as a metal ball, is located in the valve chamber 26 and normally is seated against the valve seat 36 by coil springs 64 and 66 which extend into and are located by the two sections 22, 22' of the passageway. The valve 62 is suspended between the springs, one of which is stiffer or stronger and retains the valve normally in a seated position. The spring 66 in the present embodiment as seen in FIG. 2, is heavier or stiffer and is interposed between the valve 62 and a shoulder 68 carried by the member 20. More particularly, the spring 66 extends within a guide sleeve 70 carried by the shoulder 68 in telescopic relation with the passageway 22 and defines the passageway 24. Preferably, the shoulder 68 and sleeve 70 are integral and seated in a recess 69 in member 20.

While the sleeve 70 may be formed of metal or the like, preferably it comprises a plastic material and particularly a self-lubricating plastic such as, for example, that available under the trade name "Zytell" from the DuPont Corporation. Hardened nylon materials, generally, are also suitable for this application. The sleeve 70 serves to guide and ease longitudinal flexure of the spring, preclude trapping or catching of the spring coils between the members, and prevent lateral distortion of the spring, thereby increasing both the life of the spring and the dependability of operation of the present device. The fact that the sleeve tends to reduce the aforementioned lateral distortion is a most important consideration in the present environment, in that in the absence of such a feature there is a tendency for uneven force to be applied to valve body 62 during the operation thereof. The walls of the sleeve 70 are as thin as possible to maintain the diameters of the passageways 22 and 24 substantially uniform.

The second coiled spring 64 at the upper side of the valve body 62, extends to a shoulder 72 surrounding the inlet opening 28. The spring 64 is weaker or less stiff than spring 66 and assists in unseating the valve body 62, centering the valve body when it is unseated, and inhibiting chattering of the valve body against its seat 36. In contrast, the greater stiffness and dimentioning of spring 66 provides a greater force upon the valve body 62, and, assuming that the fluid pressure in passageway sections 22, 22' are equal, a net force is applied by spring 66 upon valve body 62 which keeps the valve body firmly in contact with its seat 36 so that no auxiliary air supply will pass through the device.

Assuming now that reduced pressure conditions (vacuum) at outlet opening 30 to the engine air/fuel intake system fall below a specific point, the reduced pressure in passageway 24 will displace valve body 62 from its seat 36 and an auxiliary air supply will begin to flow through passageway 22', around the valve body through chamber 26, thence through passageways 22, 24 and out through opening 30 to the air/fuel engine intake system M. In considering this sequence of events it is important to appreciate that when the valve body 62 is unseated, effectively it is suspended between the springs 64 and 66.

Both springs fit closely within the passageways 22', 22, 24, sleeve 70 and particularly lower spring 66 are well-guided so as essentially to preclude lateral movement of body 62 during displacement thereof, and assure uniform opening and closing of the valve body.

The upstream spring 64 serves three important functions. Firstly, it tends to stabilize laterally the valve body both during and subsequent to displacement thereof, so that vibration from the enbine and related environments has little disturbing effect upon the valve body. Secondly, the spring provides a positive force which aids in unsticking the valve body at the moment of opening thereof, and provides a fast and positive movement of the valve body away from its seat as vacuum is established in the outlet 30, and renders the device highly responsive, both in terms of dependability and speed, to conditions in the engine manifold. Thirdly, the spring acts during the return of the valve body to its seated position to dampen any possible oscillation that might occur and from damaging impacts against the seat 36.

The movement or action of the valve body 62 may be varied selectively in accordance with vacuum demand by adjusting the degree to which member 20 is threadably engaged on member 14, thereby providing the spring 66 with a selected degree of compression so the force by such spring upon valve body 62 is appropriate for predetermined conditions. The device may be set by threaded adjustment of the members and tightening of lock nut 56, so as to open and close appropriately according to engine manifold conditions. Typically, when the device is installed on a particular automobile, the operator making the installation will initially adjust the length of the device, and thereby the spring compression, to a point appropriate to both the engine and the specific condition thereof.

As valve body 62 is displaced toward the open position, illustrated in dotted line, the resulting air flow opening is constituted by an annular space between the valve body and the diverging wall 34 within chamber 26. Because of the divergency of such wall, the width of the annulus within chamber 26 increases in accordance with the displacement of the body 62 from its seat. Thus, the auxiliary air flowing about the body varies in accordance with the body displacement, which is in accordance with engine requirements due to vacuum manifold conditions. The air flow about valve body and into the surrounding diverging chamber is extremely smooth and non-turbulent because of the complete symmetry of the chamber and body, the stabilization of the valve body in an axial position within the chamber by the pair of coiled springs, and the configuration of the diverging wall which tends to prevent eddying of air or the like. The convulutions of the springs are so spaced as to permit unobstructed air flow through the chamber and passages regardless of spring compression due to initial adjustment and/or displacement of the valve body.

Figure 3:
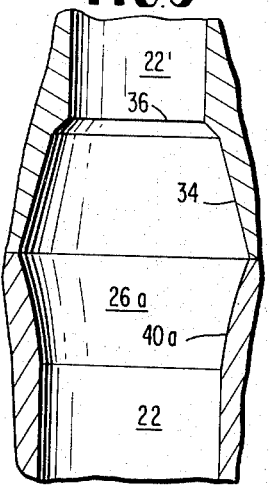
FIGS. 3, 4, 5 and 6 are diagrammatic views in cross-section of variations in valve chamber internal wall shaping.
Figure 4:
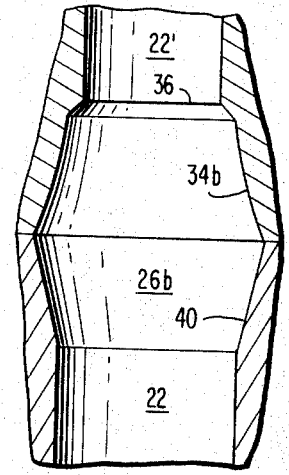
Figure 5:
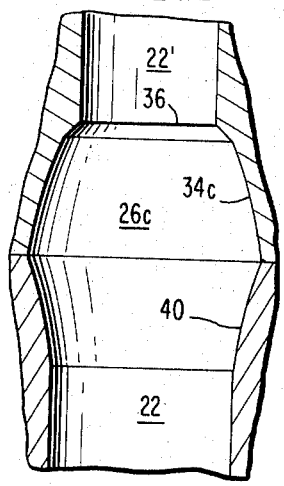
Figure 6:
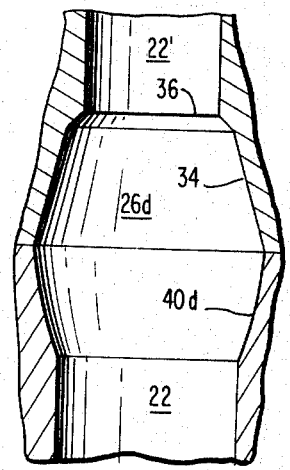

FIGS. 3, 4, 5 and 6 illustrate in schematic outline variations in the internal wall shaping of the valve chamber as alternatives to the uniform configuration of the divergent-convergent walls shown in FIG. 2, and also better show the valve seat 36. In FIG. 3 the chamber 26a essentially corresponds to that shown in FIG. 2 except that the convergent wall 40a is convex. FIG. 4 shows a chmaber 26b having a convex divergent wall 34b. In FIG. 5, the valve chamber 26c is shown as having a concave divergent wall 34c. Finally, FIG. 6 shows a chamber 26d with a concave convergent wall 40d. Other shaped chambers may be employed provided they are symmetric in shape with respect to the longitudinal axis of the device. In each instance a divergent wall and/or a convergent wall may take, as well as a linear form, the shape of an arc, a catenary, or other suitable curves or combinations thereof.

Figure 7:
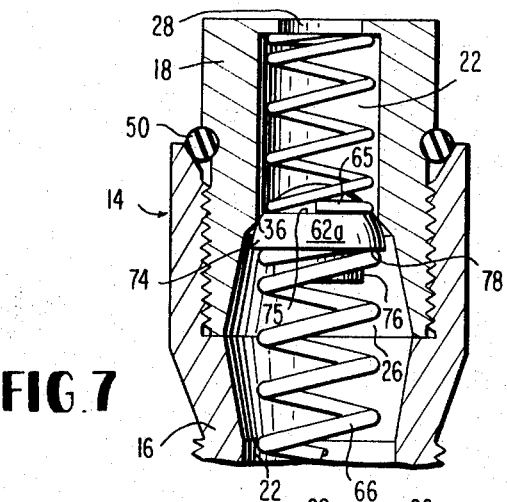
FIG. 7 is a cross-sectional view through the upper portion of the device with a modified valve body.
Figure 8:
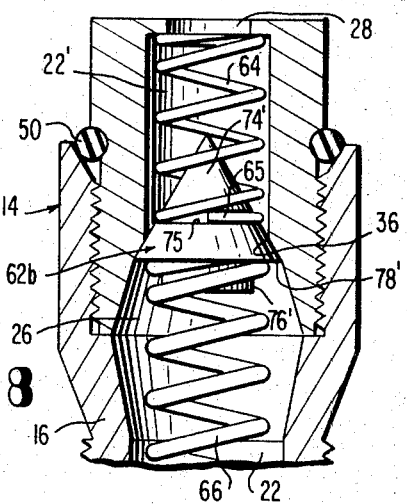
FIG. 8 is another cross-sectional view, similar to that of FIG. 7 but incorporating a further embodiment for the valve body.

The valve member is subject to modification just as the configuration of the valve chamber can be modified as illustrated in FIGS. 3-6. Modifications of the valve member are shown in FIGS. 7 and 8 wherein the valve member 62a, FIG. 7, has the configuration of a mushroom comprising a semi-spherical body portion 74 with a stem portion 76 extending axially from the diametrical plane on the underside of the body portion 74 and constituting a shoulder 78 surrounding the stem 76. According to the modification shown in FIG. 8 the valve member 62b comprises a conical body portion 74' constituting a needle valve, a stem 76', with a shoulder 78' surrounding the stem. The valve body portions 74, 74' may be provided with an annular groove or shoulder 75 constituting a seat for the engaging convolution 65 of spring 64 to establish only axial forces therebetween and preclude any tendency toward radial expansion by the spring. In both instances, the upper spring 64 bears on the body portion 74, 74', and the lower spring 66 closely surrounds the stem 76, 76', as the case may be, and bears against the respective shoulder 78, 78'. The stem portion serves to center and anchor the upper end of the spring 66 relative to the body portion of the valve so that the valve is always properly centered and maintained in correct operative position.

Figure 9:
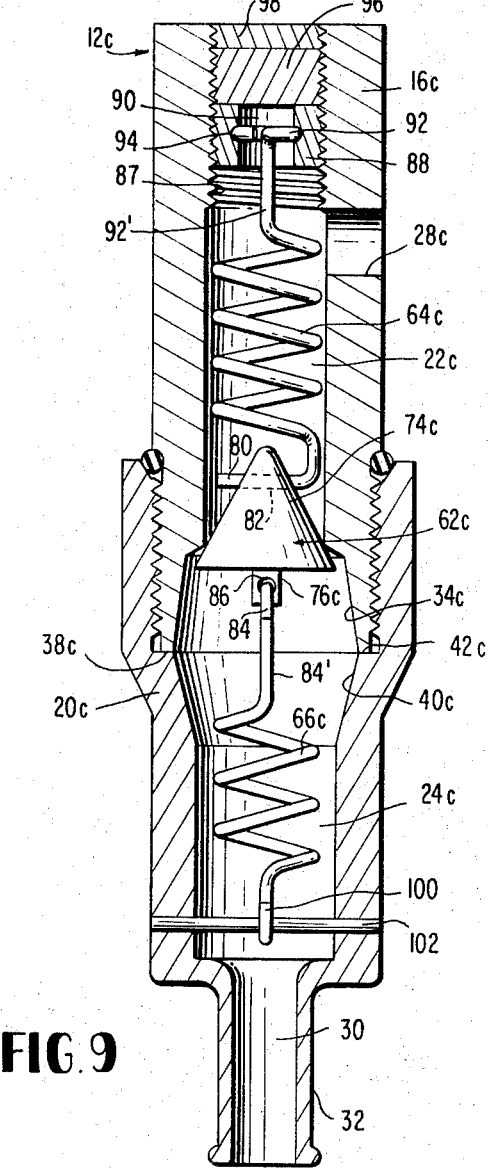
FIG. 9 is a longitudinal cross-section through an alternate embodiment of the apparatus in accordance with the present invention.

A modification of the device is shown in FIG. 9 wherein the springs constitute tension rather than compression springs. For this purpose the springs must be fixed to the valve member, which conveniently may constitute a needle valve 62c comprising a conical body portion 74c and stem 76c. In order to attach the springs to the valve member 62c of the vertically disposed device as shown, the upper spring 64c terminates at its lower end in an end portion 80 extending diametrically of the passageway 22c and through a corresponding bore 82 in the body portion 74c of the valve member. Similarly, the lower spring 66c has its upper end 84 hooked through a bore 86 in the stem 76c.

According to this modification, the body members of the device 12c necessarily are modified in that the upper body member 14c comprises a single tubular element 16c and with the valve chamber forming diverging wall 34 formed in the lower end of the body member 14c while the converging wall portion 40s is formed in the upper end of the body member 20c. According to this structure, the lower end 38c of the upper member 14c abuts a corresponding transverse wall 42c on the lower member 20c at the point of maximum transverse dimension of the valve chamber 26c.

To support the springs under tension, the free end portion of the bore of the passageway 22c of the body member 14c has internal threads 87 to receive an externally threaded annular nut 88 having an axial bore 90 therein to receive the annular upper end 92 of the upper spring 64c and which is swivelly seated within an internal groove 94 in the bore 90. Thus, the tension of the upper spring may be adjusted by threading the nut 88 within the member 14c, such adjustment affecting only the axial tension of the spring without twisting due to the swivel action of the annular end 92 in the groove 94. The nut 88 is retained in adjusted position by a threaded plug 96, and, preferably, also an externally threaded sealing member 98. In this instance the inlet opening 28c opens through the side wall of the member rather than through the end.

The lower spring 66c is anchored at its lower end by a bent portion 100 hooked around a cross pin or bar 102 disposed transversely of passageway 24c in the body member 20c. Thus, the two springs apply tension to the valve body and the upper spring 64c, being stronger, tends to pull the valve body into closed position whereas the lower spring 66c tends to pull the valve body into open position. Adjustment of the tension of the springs on the valve body is effected by adjustment of the nut 88 to vary the tension of the upper spring 64c rather than adjustment to vary the effectiveness of operation of the lower spring as in the previously described embodiments employing compression springs. In this case, the upper spring 64c is stronger than the lower spring 66c so that the operative effect of the two springs is reversed from that of the compression springs.

The inlet opening 28c is located adjacent the inner ends of the internal threads 87 to enable adjustment of the nut 88 to its maximum extent inwardly without blocking and restricting any part of the area of said opening. Preferably, the upper convolution of the spring 64c is located below the inlet opening 28c and connected with the annular end 92 by an axially disposed straight portion 92' that spans the area of the inlet opening to minimize turbulence of incoming air admitted through said opening. Similarly, the upper convolution of the spring 66c is located below valve chamber 26c and connected with the hook portion 84 by an axially disposed straight portion 84' that spans the convergent area of the valve chamber to minimize turbulence of the air passing around the valve body and through said chamber.

Figure 10:
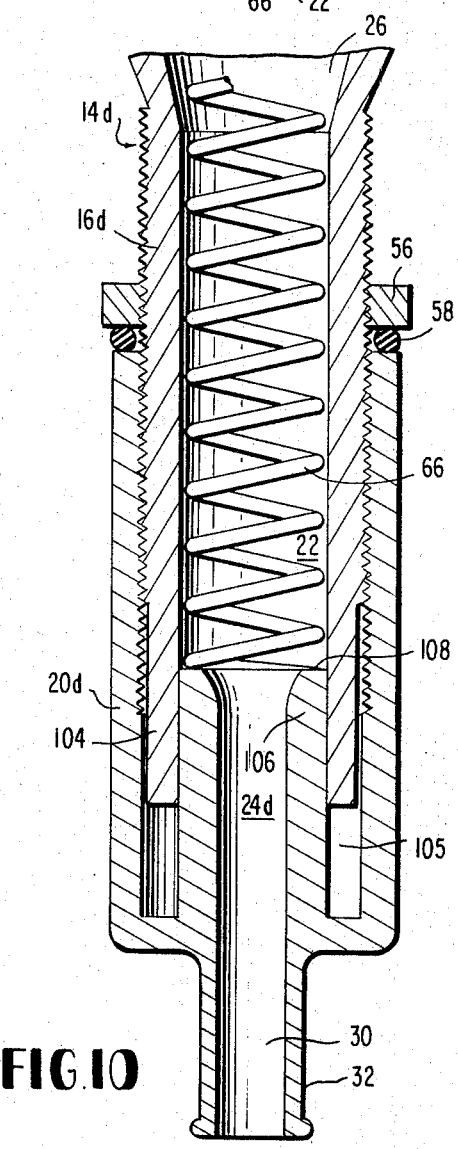
FIG. 10 is a longitudinal cross-section through still another embodiment of the device in accordance with the present invention.

A further modification of the device is shown in FIG. 10 wherein the lower portion 16d of the upper body member 14d is extended downwardly to define a sleeve 104 and the lower body member 20d has an upwardly extending axially disposed, inner tubular portion 106 formed integrally therewith and defining with the outer body shell of the member 20d an annular groove 105 for receiving the sleeve 104, the tubular portion 106 defining the passage 24d in member 20d. The upper end 108 of the tubular portion 106 provides an abutment for the lower end of the spring 66 so that adjustment of the compression of the spring is effected by relative adjustment between the body members 14d and 20d and which results in axial movement of the inner end 108 of the tubular portion 106 relative to the valve body within the valve chamber.

In effect, the passage 22 of the member 14d defines an enclosure in firm contact with the spring 66 to guide and stabilize the spring throughout its length. HOwever, the telescoping effect of the tubular portion 106 within the passage 22 enables adjustment of the compression of the spring. Thus, the full advantages of a sleeve construction, as shown in FIG. 2, are achieved by the present embodiment, which additionally provides full length contact between the passage and the spring. Obviously, once the device is adjusted to provide desired spring forces, it may be secured by a lock nut 56 and sealed by a ring 58. The internal threads within the member 20d extend along a length of the member outer shell sufficient to accommodate the necessary adjustment of the two members but short of the position of the inner end of 108 of the tube 106, and the sleeve 104 of member 14d has an unthreaded free end portion to telescope within the groove 105.

In all of the foregoing modifications, it is of extreme importance that the maximum cross-sectional area of air flow through the psasageways and openings, both inlet and outlet, be at least as great as the maximum annular cross-sectional area of air-flow around the valve body and through the valve chamber. The maximum cross-sectional air flow area of the respective passageways is the diameter of the passageways minus the diametrical mass of the spring therein. The maximum air flow area through the valve chamber must be sufficient to accommodate the maximum demand of the particular engine with which the device is to be associated. Thus, for large engines having heavy demand potential the maximum air-flow area through the chamber must be relatively large to accommodate the demand which will depend upon both load and barometric pressure conditions because the demand increases as altitude decreases.

To preclude the necessity of providing a plurality of models of the device having different dimensions, each specifically adapted for a different engine having different potential demands, or requirements for auxiliary air, the device according to the invention is adapted for substantially universal use by certain essential features. The first of these essential features is the adjustable control of the spring forces effective upon the valve body. Thus, the device may be designed for normal use with optimum efficiency with a large engine having potentially large demand but by adjustment of the applicable spring forces the same device may be used with equally optimum efficiency with smaller engines having lesser demand potential.

In other words, for a large engine, the spring adjustment must be such as to permit unseating of the valve member to provide maximum cross-sectional air flow around the valve member and through the valve chamber, whereas for smaller engines the effective spring forces applied to the valve member is adjusted to permit unseating of the valve member to a limited extent sufficient to provide air flow to satisfy the requirements of such smaller engine but less than the possible maximum flow area.

It will be understood that the convolutions of the main compression spring 66 must be so spaced from each other that they will not obstruct or block free flow of the volume of air passed by the opened valve. Thus, as the spring is compressed, both by adjustment and operation, the spacing of the convolutions readily will pass the controlled volume of air. The spring forces acting on the valve member, regardless of adjustment, must be such that, regardless of the amount of vacuum, the valve member cannot be displaced from its seat beyond coincidence of its maxumum cross-sectional area with the maximum cross-sectional area of the valve chamber.

The efficacy of devices in accordance with the invention in reducing undesirable gaseous exhaust components of internal combustion engines, has been established in tests run on representative vehicles operating under varying conditions.

EXAMPLE

Tests were run upon a 1967 Chevrolet equipped with a standard Rochester Four Barrel carburetor, the vehicle being operated under identical conditions with and without a device similar to the FIG. 2 embodiment herein. Results were as follows, where the figures cited represent the average values of the test vehicle during the course of the test program.

| Tests | 1 and 2 | 3 and 4 | | |
|---|---|---|---|---|
| | Without Device Baseline (Factory Specs) *Mean Aver. | With Device "Mean Average | Exhaust Emissions Federal-US Standards controlled vehicles | Exhaust Emissions California Standards uncontrolled vehicles |
| Carbon a) Monoxide CO, % | 2.10 | 0.89 | 1.50 | 2.00 |
| Hydrocarbons b) HC, parts per million | 409 | 333 | 275 | 350 |
| Nitrogen c) Oxides NOx, parts per million | — | — | 350 | 700 |

Mean Average Reduction
a) Carbon Monoxide. (CO, %) Decreased from baseline TIA-CHEV-1AD to TIA-CHEV-1BD by 58%.
b) Hydrocarbons. (HC, ppm) Decreased from basement TIA-CHEV-IAD to TIA-CHEV-1BD by 43%.
c) Nitrogen Oxides, (NOx) Not measured.

We claim:

1. An exhaust emission control and fuel economizer device for an internal combustion engine, comprising in combination:
    a first cylindrical member having an air intake port opening into a first axial passageway;
    a second cylindrical member having a second axial passageway terminating in an air output opening connectable to a reduced pressure air/fuel intake point at the engine;
    said first and second members being connected with said first and second passageways aligned and defining a through passageway;
    said through passageway including concentric base-to-base, frusto-conical divergent and convergent portions defining a valve chamber;
    the frustum of said divergent portion and said first passageway being joined and defining an annular valve seat;
    a valve body axially symmetric within said chamber;
    first and second springs contacting opposite sides of said valve body and extending in opposite directions in said passageways, said springs biasing said valve body in opposite directions with respect to said valve seat, said first spring biasing said body against said seat and providing a greater force than said second spring, whereby the through passageway normally is closed, reduction of pressure at said output opening due to engine loading displacing said valve body from said seat to provide an annular air passageway between said valve body and said divergent chamber wall, said annular passageway being of increasing cross-section in accordance with the valve body displacement to provide a smoothly increasing flow of auxiliary air as a function of engine vacuum; and
    means adjustably connecting said members to vary the length of the passageway in which said first spring is disposed and thereby selectively vary the action of said first spring on said valve body, whereby the opening and closing response points of said valve body may be set to a selected value.

2. A device in accordance with claim 1 wherein said first and second members are adjustably threadable with respect to one another, the degree of inter-threading thereof varying the length of the said passageway in which said first spring is disposed, and further including lock nut means engaging the threads of one of said inter-threaded members for bearing against a shoulder on the other of said members, thereby fixing the degree of inter-threading.

3. A device in accordance with claim 2 comprising a sealing ring between said lock nut and shoulder for preventing air leakage into or out of said passageway.

4. A device in accordance with claim 2 comprising a sleeve positioned in said passageway in communication with said output opening, said sleeve closely surrounding said first spring to guide said spring and prevent lateral displacement thereof.

5. A device in accordance with claim 4 wherein said valve chamber is defined entirely within said first cylindrical member, and wherein said first member comprises inter-threaded intermediate and end portions, the two said portions being separable at the maximum diameter of said valve chamber whereby said chamber is accessible for cleaning and servicing by unthreading of said portions.

6. A device in accordance with claim 1 wherein said valve body comprises a sphere.

7. A device in accordance with claim 1 wherein said valve body comprises a generally conical body positioned in said chamber with the apex thereof extending in the direction of said intake port, whereby the diverging side wall of said conical body is engagable with said valve seat.

8. A device in accordance with claim 1 wherein said valve body comprises a mushroom-shape having semispherical and steam portions, the said body being oriented in said valve chamber such that the concave exterior of said semispherical portion is seatable against said valve seat.

9. A device in accordance with claim 7 wherein said first and second springs are secured to opposite sides of said valve body and bias the said body by tension, said second spring biasing said body towards opening being fixed to said second member adjacent said output opening, means adjustably positioned in said first passageway beyond said intake opening from said valve chamber, said first spring biasing said body toward said valve seat being secured to said means for selective variation of the tension of said spring on said valve body.

10. A device in accordance with claim 9 wherein said means comprises an anchor nut threaded upon internal threads in said first passage, said spring end being joined to said nut for free rotation therebetween, whereby said nut may rotate with respect to said spring end and axially displace said end by threaded adjustment of said nut.

11. A device in accordance with claim 10 comprising a lock nut overlying said anchor nut for fixing the axial position of said anchor nut.

12. A device in accordance with claim 11 wherein the said first passage of said first member is closed at its axially terminal point, and wherein said air input port comprises a lateral opening passing through the side wall of said first member and into said first passage at a point between said valve chamber and said anchor nut.

13. A device according to claim 1 wherein said second member comprises an outer cylindrical shell and an inner tubular portion concentrically spaced within said shell, said tubular portion defining said second passageway, and a shoulder at its inner end, said first member having an extended sleeve portion telescoped between said shell and tubular portion, said first spring comprising a compression spring bearing at its end opposite said valve body against said shoulder and substantially contacting the wall of said passageway between said shoulder and said valve body, said inner wall thereby acting as a guide preventing lateral displacement of said spring.

* * * * *

UNITED STATES PATENT OFFICE
CERTIFICATE OF CORRECTION

Patent No. 3,756,270                     Dated September 4, 1973

Inventor(s) Marco A. Fonseca, Enrique T. Gibbon, Jose J. Gonzalez

It is certified that error appears in the above-identified patent and that said Letters Patent are hereby corrected as shown below:

IN THE HEADING INSERT:

Foreign application priority data -

Apr. 11, 1969     Mexico --------110,365

Signed and sealed this 27th day of November 1973.

(SEAL)
Attest:

EDWARD M. FLETCHER, JR.                RENE D. TEGTMEYER
Attesting Officer                      Acting Commissioner of Patents

FORM PO-1050 (10-69)